June 7, 1932.  R. B. SHANCK  1,861,553

ALARM CIRCUIT

Filed April 29, 1931

INVENTOR
*R. B. Shanck*
BY
ATTORNEY

Patented June 7, 1932

1,861,553

UNITED STATES PATENT OFFICE

ROY B. SHANCK, OF FLUSHING, NEW YORK, ASSIGNOR TO AMERICAN TELEPHONE AND TELEGRAPH COMPANY, A CORPORATION OF NEW YORK

ALARM CIRCUIT

Application filed April 29, 1931. Serial No. 533,804.

The invention relates to arrangements for locating or indicating short interruptions on electrical circuits.

One of the applications of the invention may be in connection with telegraph circuits wherein the arrangements of the invention may be connected to the receiving relay so as to locate or detect short interruptions or "hits" such as might be caused by any false movement of the armature from the marking contact of the receiving relay, while the circuit is quiet or while signals are being sent from the observing station.

The indicating arrangements of the invention comprise a circuit including an alarm device and a gas filled tube, so as to be practically instantaneous in operation and capable of giving an indication for even the shortest interruption which would be of any importance. Obviously the indicator device of the invention could be applied not only to telegraph circuits but to any communication circuit or other apparatus where it might be desired to detect any separation or connection between two electrical contacts connected to or associated with a suitable source or sources of potential. In making use of the arrangements of the invention in connection with telegraph service maintenance a few of the indicator devices would be provided at each repeater station, and in order to determine the location of intermittent short interruptions an indicator would be connected at each of several repeaters on the circuit under investigation. As the indicator device of the invention employs a tube filled with a gas, such for example as neon, the impedance of the device would be so high that its connection to an electrical circuit would have no noticeable effect on the operation of the circuit. Furthermore, a direct indication would be afforded by the flashing of the tube upon circuit interruptions. Other objects and features of the invention will appear more fully from the detailed description thereof hereinafter given.

Figure 1:
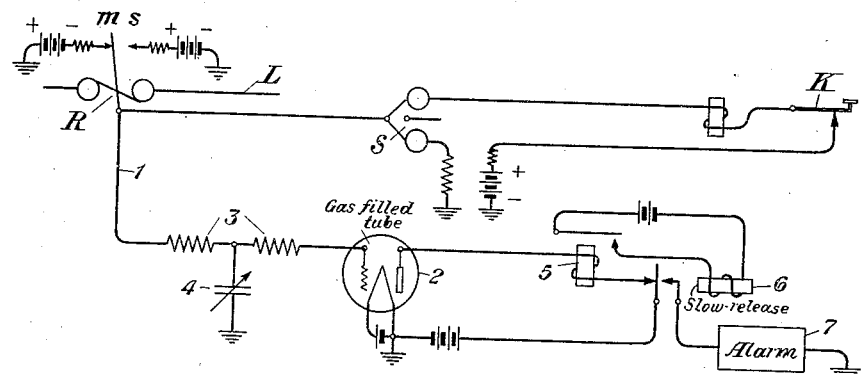
Figure 2:
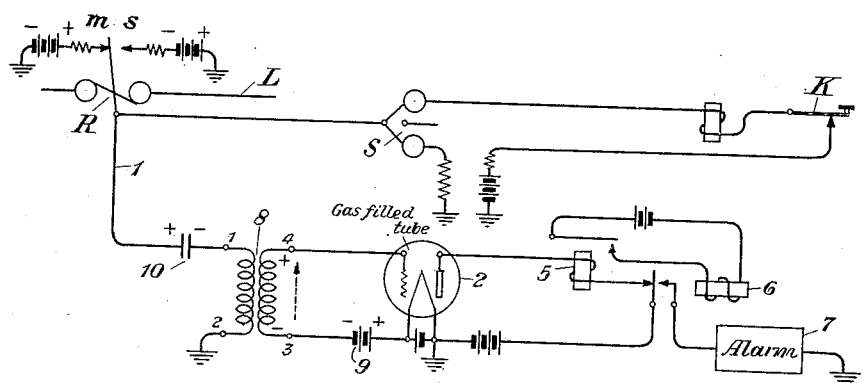
Figure 3:
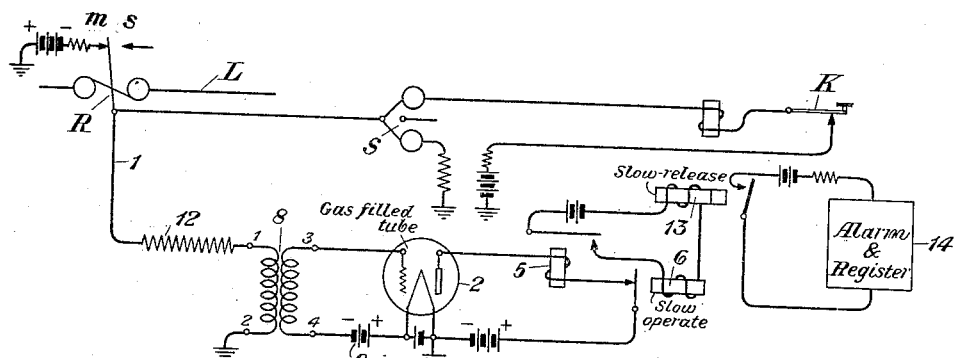

The invention may be more fully understood from the following description together with the accompanying drawing in the Figures 1, 2 and 3 of which are shown circuit diagrams embodying a preferred form of the invention, and modifications thereof. Similar reference characters have been used to denote like parts in all of the figures.

In Fig. 1 is shown a telegraph repeater associated with the telegraph line L. The telegraph repeater comprises the usual receiving relay R, the armature of which cooperates with the marking and spacing contacts $m$ and $s$. Connected to the armature of the receiving relay is a circuit including the sending relay S and the subscriber's key K, together with other apparatus usually associated therewith. As such telegraph repeater apparatus is well known in the art, no description of its operation will be given. Connected to the armature of the receiving relay R is a conductor 1 including a high resistance 3 and connected to the grid of a gas filled tube 2. This tube may be filled, for example, with a gas such as neon. The output circuit of the tube includes a relay 5 which controls the operation of another relay 6 which controls the operation of an alarm device 7. When the telegraph circuit is idle, or when sending is in progress, the armature of the receiving relay R would normally be at rest on the marking contact $m$. As has been heretofore pointed out, one of the objects of the invention is to obtain an indication whenever the receiving relay armature leaves the marking contact $m$, under conditions when the circuit is idle or while sending is in progress. The marking battery connected to contact $m$ in the arrangement of Fig. 1, is so poled that a negative potential will be applied from the armature of the receiving relay over conductor 1 and resistance 3 to the grid of the tube 2. This will give the grid such a negative bias that the tube 2 will normally remain inoperative. It is pointed out that the impedance of the tube will be so high that its connection to the armature of the receiving relay will have no noticeable effect on the operation of the telegraph circuit. When the armature of the receiving relay leaves the marking contact $m$, the negative potential on the grid of the tube will be reduced and current will flow in the output circuit of the tube through the relay 5 thereby operating said relay. The tube circuit will also give a visual indication due to the glow in the tube 2. The operation of relay 5 will close a circuit for the relay 6 thereby operating relay 6. The operation of relay 6 will close a circuit for the alarm device 7 from ground over the contact of relay 6 and through the plate battery of the tube 2 to ground. Relay 6 is preferably of the slow release type so as to give an alarm of suitable duration. Upon interruption of the plate circuit by the operation of relay 6, relay 5 will be de-energized and will thus open the circuit of relay 6 so that the armature of the slow release relay 6 will again close the plate circuit putting the apparatus into its original condition, so that any subsequent interruption may give a further indication. The condenser 4 has been shown bridged to ground at an intermediate point of the high resistance 3. This condenser may or may not be provided, depending on whether it is desirable to have the indicator device operate on interruptions of extremely short duration. The utilization of the condenser would probably be undesirable in most applications of the invention, as it probably would be desirable to obtain an indication for even the shortest interruption which might occur.

In some instances the marking contact of the telegraph receiving relay has positive battery connected to it instead of negative battery. For such cases a different arrangement from the one heretofore described would be necessary. Accordingly, in Fig. 2 is shown an application of the invention suitable for use when the marking contact of the receiving relay has positive battery connected thereto instead of negative battery. In this arrangement a condenser 10 is provided in the conductor 1 which terminates in the primary winding of a transformer 8 having its winding poled as shown. In the grid circuit of the tube 2 there is provided a negative grid biasing battery 9 so that when no voltage is supplied to the indicating device the tube 2 will be blocked and remain inoperative. When the circuit is in its normal condition as shown, the marking battery will charge the condenser 10 as shown. If the armature of the receiving relay leaves the marking contact the condenser 10 will discharge through the primary winding of transformer 8 in such a direction as to impress an induced voltage in the secondary winding of transformer 8 in the direction of the dotted arrow. The circuit constants would be such that this induced voltage would overcome the grid biasing voltage of the battery 9 and cause the tube 2 to be temporarily unblocked. This would cause the tube to operate and current would be transmitted over the output circuit thereof and operate relay 5. The operation of the alarm device and restoring arrangement would then be the same as heretofore described with respect to Fig. 1.

In the modification of the invention shown in Fig. 3, negative battery is again connected to the marking contact of the receiving relay R. A high resistance 12 is included in the circuit 1 instead of a condenser 10. The grid of the tube 2 is associated with the armature of the receiving relay by means of the transformer 8 and the high resistance 12. When the armature of the receiving relay leaves the marking contact, the tube will operate and relay 5 will be operated. The operation of relay 5 will close a circuit for the slow release relay 13 and the slow operating relay 6. The operation of relay 13 will close a circuit for an alarm and register device 14. After a certain interval, the slow operating relay 6 will function to open the plate circuit of the tube, thus releasing relay 5 which will open the circuit for relays 13 and 6 and restore the apparatus to normal.

While the arrangements of the invention has been disclosed as embodied in certain specific arrangements which are deemed desirable, it is understood that they are capable of embodiment in many and other widely varied forms without departing from the spirit of the invention as defined in the appended claims.

What is claimed is:

1. A circuit having an electrical contact connected to a source of potential, and another contact with an alarm circuit and a load impedance connected thereto in parallel, said alarm circuit being normally maintained in an inoperative condition when said two electrical contacts are closed and being operated when said contacts are separated.

2. A circuit having an electrical contact connected to a source of potential, and another contact with an alarm circuit and a load impedance connected thereto in parallel, said alarm circuit having a high impedance translating device therein normally maintained in an inoperative condition by the polarity of said source of potential.

3. In a telegraph system, a telegraph repeater including a receiving relay having an armature co-operating with marking and spacing contacts, an alarm circuit connected to the armature of said receiving relay, said alarm circuit including a high impedance translating device normally maintained in an inoperative condition when the armature of said receiving relay is on its marking contact, and an alarm device connected to the output of said translating device.

4. In a telegraph system, a telegraph repeater including a receiving relay having an armature cooperating with marking and spacing contacts, a gas filled tube, a circuit connecting one of the electrodes of said tube to the armature of said receiving relay whereby the potential applied to said electrode from said armature will determine the operativeness of said tube, and responsive means controlled by said tube.

5. In a telegraph system, a telegraph repeater including a receiving relay having an armature cooperating with marking and spacing contacts, a gas filled tube, a circuit connecting the grid of said tube to the armature of said receiving relay, means for normally maintaining a negative potential on said grid to block the operation of said tube, means operative when said receiving relay armature leaves its marking contact for removing the blocking potential on said grid, and indicating means connected to the output circuit of said tube.

6. In a telegraph system, a telegraph repeater including a receiving relay having an armature cooperating with marking and spacing contacts, said marking contact having a negative potential applied thereto, a gas filled tube, a circuit connecting the grid of said tube to the armature of said receiving relay whereby the potential from said marking contact may apply a blocking potential to said grid and cause said tube to be inoperative, and indicating means connected to the output circuit of said tube.

7. In a telegraph system, a telegraph repeater including a receiving relay having an armature cooperating with marking and spacing contacts, a gas filled tube, a circuit connecting one of the electrodes of said tube to the armature of said receiving relay, means for normally maintaining a blocking potential on said electrode to block the operation of said tube, means operative when said receiving relay armature leaves its marking contact for removing the blocking potential on said electrode, relay means in the output circuit of said tube, a circuit controlled by said relay and including a slow release relay and a slow operate relay, an indicating device controlled by said slow release relay, and means controlled by said slow operate relay for opening said tube output circuit.

8. A circuit having an electrical contact connected to a source of potential, and another contact with an alarm circuit and a load impedance connected thereto in parallel, said alarm circuit having a high impedance translating device therein normally maintained in an inoperative condition by the potential applied thereto, said electrical contacts being arranged so that when operated they will so change the potential applied to said translating device that it will operate.

9. In a telegraph system, a telegraph repeater including a receiving relay having an armature cooperating with marking and spacing contacts, a gas filled tube, a circuit connecting the grid of said tube to the armature of said receiving relay, means for normally maintaining a negative potential on said grid to block the operation of said tube, means operative when said receiving relay armature strikes its spacing contact for removing the blocking potential on said grid, and indicating means connected to the output circuit of said tube.

In testimony whereof I have signed my name to this specification this 28th day of April, 1931.

ROY B. SHANCK.